Figure 1:
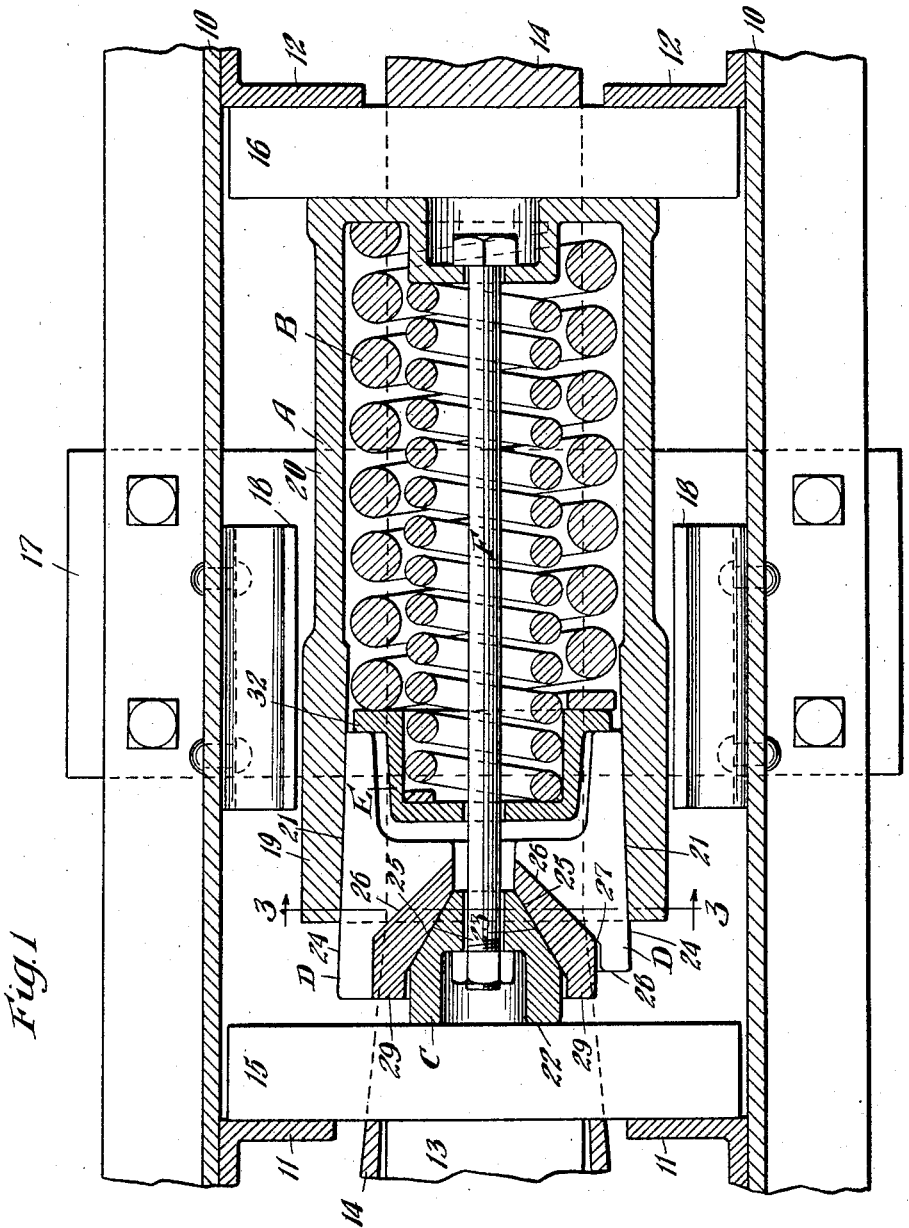

Jan. 13, 1925.

J. F. O'CONNOR 1,522,539

FRICTION SHOCK ABSORBING MECHANISM

Filed Feb. 8, 1923

2 Sheets-Sheet 1

Witnesses
Wm. Geiger

Inventor
John F. O'Connor
By George J. Haight
His Atty.

Jan. 13, 1925.
J. F. O'CONNOR
1,522,539
FRICTION SHOCK ABSORBING MECHANISM
Filed Feb. 8, 1923    2 Sheets-Sheet 2
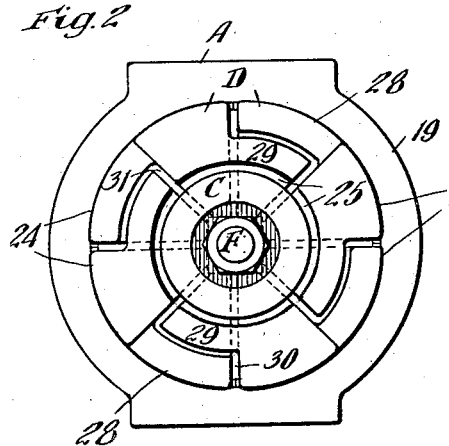
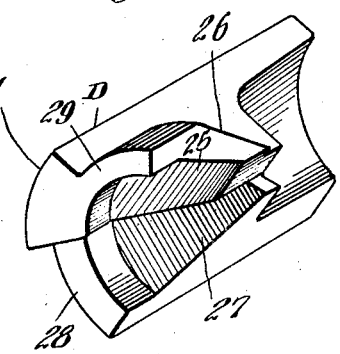
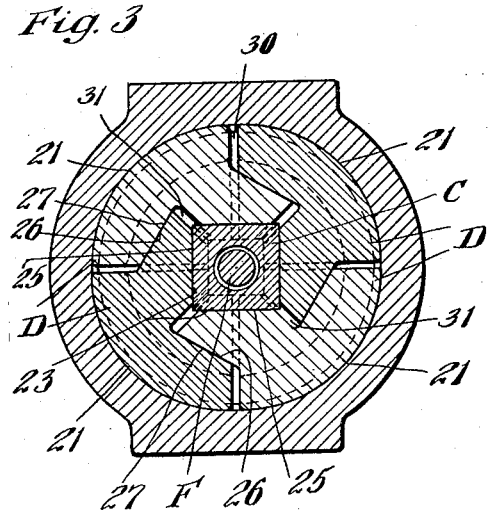
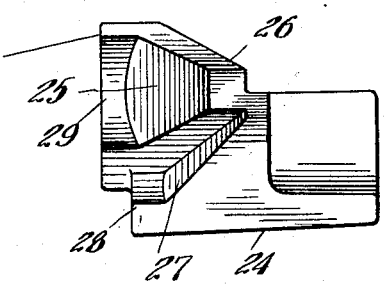
Witnesses
Wm. Geiger
Inventor
John F. O'Connor
By George I. Haight
His Atty Patented Jan. 13, 1925.

1,522,539

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 8, 1923. Serial No. 617,693.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein are obtained high capacity and certain release.

More specifically, an object of the invention is to provide a mechanism of the character indicated wherein are employed a pressure-transmitting wedge, a cooperating series of surrounding friction shoes, each shoe having wedge engagement with adjacent shoes, in combination with a tapered confining member, by which differential and circumferential contracting action on the shoes is produced during a compression stroke.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper corresponding to the line 3—3 of Figure 1. Figure 4 is a detail perspective of one of the friction shoes. And Figure 5 is an elevational view of one of the friction shoes.

In said drawings, 10—10 denote the usual draft sills of a car underframe to the inner faces of which are secured front stop lugs 11 and rear stop lugs 12. A portion of a draw bar is indicated at 13, the same being operatively associated with the shock absorbing mechanism proper by a hooded cast yoke 14, within which is disposed said mechanism and front and rear followers 15 and 16. The yoke and parts therewithin are supported in operative position by a detachable saddle plate 17. The mechanism is of that character employing a shell and spring cage of cylindrical form throughout and in order to maintain it in a central position, the inner faces of the draft sills have secured thereto, guide plates 18—18.

The friction shock absorbing mechanism, as shown, comprises, broadly, a combined friction shell and spring cage casting A; a spring resistance B; a pressure-transmitting wedge C; four friction shoes D—D; a spring cap E; and a retainer bolt F.

The casting A is of substantially cylindrical form throughout its length with the friction shell proper 19 formed at its front end and the spring cage proper 20, rearwardly thereof. The interior of the shell 19 is formed with four independent cylindric friction surfaces 21, each extending through an arc of approximately 90°, said cylindric surfaces converging inwardly of the shell and extending at a comparatively acute angle with respect to the axis of the mechanism.

The pressure-receiving and transmitting wedge C is preferably in the form of a hollow cast block having a front bearing face 22, engaging the front follower 15. On its rear side, the wedge C is provided with four wedge faces 23—23 symmetrically arranged around the axis of the wedge and making the latter pyramidal in form.

The four friction shoes D are of like construction. Each of said shoes is provided on its outer side with a cylindric friction surface 24 extending through an arc of approximately 90° and cooperable with one of the corresponding shell surfaces 21. On its inner side, that is, the side toward the axis of the shell, each shoe D is provided with a keen angled wedge face 25 cooperable with one of the wedge faces 23 of the wedge C. In addition, each shoe D is provided with a rearwardly facing wedge face 26 and a forwardly facing wedge face 27, the wedge face 27 being circumferentially offset from the wedge face 25 and the wedge face 26, being disposed behind the wedge face 25. Each shoe C is also cut away, at its front end, through an arc of approximately 45°, as indicated at 28, and an annular flange is left as indicated at 29, extending through an arc of approximately 45° but inwardly spaced from the outer periphery of the shoe, as best shown in Figures 4 and 5. With this construction, a wedge face 26 of one shoe D overlies and cooperates with the wedge face 27 of the next adjacent shoe, this arrangement being preserved in the case of successive shoes around the shell. The inclination of the cooperating sets of shoe wedge faces 26 and 27 is made considerably blunter than the inclination of the cooperating sets of wedge faces 23 and 25 of the wedge C and shoes, respectively, this being best indicated in Figure 1. In this connection, it will be noted that ample clearance, radially, is left between the outer portions of the friction-shoes as indicated at 30—30 and between the adjacent inner portions of the shoes as indicated at 31—31 in Figure 3, for the purpose hereinafter described.

The spring cap or follower E is preferably cup-shaped so as to provide for the inner lighter coil of the spring resistance and has a flange 32 for the outer heavy coil of the spring resistance. Said flange 32 also engages the inner ends of the four shoes D.

The retainer bolt F is anchored at its inner end within a suitable hollow boss formed integral with the casting A and at its forward end is anchored within the wedge C, as clearly indicated in Figure 1.

The operation of the mechanism is as follows, assuming an inward or buffing movement of the draw bar. As the latter moves inwardly, the front follower 15 and wedge C move simultaneously therewith. A wedging action is obviously set up between the wedge C and all four shoes D on the cooperating sets of faces 23 and 25, thus tending to expand the friction unit laterally or circumferentially. As the shoes are forced inwardly of the shell under the action of the wedge C, the shoes D are necessarily compelled to approach each other laterally or transversely as they travel down the inclined shell surfaces 21. This necessitates a contraction, circumferentially, of the four shoes considered as an entirety, which is permitted by reason of the clearances 30 and 31 heretofore referred to. A contraction of the shoe entity, above mentioned, in turn, necessitates a sliding action of the shoes with respect to the wedge C, the shoes being slightly accelerated longitudinally with respect to the wedge C, thus producing high frictional resistance. In addition to the foregoing, a wedging action is set up between each shoe and the two adjacent shoes on the cooperating sets of wedge faces 26 and 27 and during the contraction of the shoe entity, the wedge faces 26 and 27 of any pair of shoes will slip on each other approximately in a radial direction. This, in turn, increases the frictional resistance so that an extremely high capacity is obtained without the necessity of employing two acute wedging angles on any of the cooperating parts.

During the compression stroke, the friction shell will necessarily be slightly expanded and energy stored up therein which, when the actuating force is removed, immediately becomes available, due to the contraction of the shell, to initially contract the shoe unit slightly more. This, in turn, is effective to squeeze out the wedge C from within the shoe sufficiently to relieve the pressure between the sets of wedge faces 23 and 25, and, in turn, between the shoe friction surfaces and the shell friction surfaces. The spring B then operates to restore all of the parts to their normal full release position.

In actual practice, the spring B will be placed under an initial compression so that, as wear occurs on the parts, the shoes D may be gradually moved forwardly to automatically compensate for the wear.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell; of a spring resistance; a pressure-transmitting wedge having a plurality of wedge faces disposed symmetrically around the axis of the mechanism; and a plurality of friction-shoes cooperable with the shell and having wedge-engagement with the wedge, said shoes having also wedge-engagement with each other.

2. In a friction shock absorbing mechanism, the combination with a friction shell; of a spring resistance; a pressure-transmitting wedge; and a plurality of friction-shoes cooperable with the shell and having wedge-engagement with the wedge, said shoes having also wedge-engagement with each other, on faces inclined at a blunter angle to the axis of the shell than that of the engaging faces of the wedge and shoes.

3. In a friction shock absorbing mechanism, the combination with a movable main follower; of a friction shell having interior friction surfaces converged inwardly of the shell; of a spring resistance; a pressure-transmitting wedge movable in unison with said follower; and a plurality of friction-shoes cooperable with the shell friction surfaces, said shoes having each wedge-engagement with the wedge and wedge-engagement with adjacent shoes, all the shoes considered as a unit being circumferentially contracted during a compression stroke.

4. In a friction shock absorbing mechanism, the combination with a friction shell; of a spring resistance; a pressure-transmitting wedge; and a plurality of friction-shoes cooperable with the shell, each shoe having a wedge face cooperating with a face of the wedge and provided also with a lateral extension overlapping the next adjacent shoe, said overlapping extensions and correspondingly engaged portions of adjacent shoes having coacting faces inclined to the axis of the shell.

5. In a friction shock absorbing mechanism, the combination with a friction shell having a plurality of independent cylindric friction surfaces on the interior thereof converged inwardly of the shell; of a spring resistance; a pressure-transmitting wedge; and a plurality of friction shoes each having an outer cylindric friction surface cooperating with a shell surface, each shoe having an inner wedge face cooperable with a face of said wedge and additional forwardly and rearwardly facing wedge faces cooperating with rearwardly and forwardly facing wedge faces, respectively, of adjacent shoes.

6. In a friction shock absorbing mechanism, the combination with a friction shell having a plurality of independent cylindric friction surfaces on the interior thereof converged inwardly of the shell; of a spring resistance; a pressure-transmitting wedge; and a plurality of friction shoes each having an outer cylindric friction surface cooperating with a shell surface, each shoe having an inner wedge face cooperable with a face of said wedge and additional forwardly and rearwardly facing wedge faces cooperating with rearwardly and forwardly facing wedge faces, respectively, of adjacent shoes, the cooperating wedge faces of the wedge and shoes extending at a keener angle to the axis of the shell than the engaging wedge faces of the shoes.

7. In a friction shock absorbing mechanism, the combination with a friction shell having interior, independent, cylindric friction surfaces converged inwardly of the shell; of a spring resistance; a pressure-transmitting wedge having a plurality of wedge faces corresponding in number to the number of shell friction surfaces; a plurality of friction shoes corresponding in number to the number of shell surfaces, each shoe having an outer cylindric friction surface, an inner wedge face cooperating with a face of the wedge, a forwardly facing wedge face circumferentially offset from the first named wedge face and a rearwardly facing wedge face, the rearwardly facing wedge face of one shoe overlapping and cooperating with the forwardly facing wedge face of an adjacent shoe; and a spring follower interposed between the spring resistance and the inner ends of the friction shoes.

8. In a friction shock absorbing mechanism, the combination with a friction shell; of a spring resistance; a circular series of friction shoes cooperating with the shell, said shoes having coacting wedge faces; and a wedge pressure-transmitting member cooperating with said shoes.

In witness that I claim the foregoing I have hereunto subscribed my name this 3rd day of February 1923.

JOHN F. O'CONNOR.

Witnesses:
FRANCES SAVAGE,
HARRIETTE M. DEAMER.